United States Patent
Otaguro et al.

(10) Patent No.: US 10,866,191 B2
(45) Date of Patent: Dec. 15, 2020

(54) ATOMIC ABSORPTION SPECTROPHOTOMETER

(71) Applicant: SHIMADZU CORPORATION, Kyoto (JP)

(72) Inventors: Atsuhiko Otaguro, Kyoto (JP); Osuke Kobayashi, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 0 days.

(21) Appl. No.: 16/668,069

(22) Filed: Oct. 30, 2019

(65) Prior Publication Data
US 2020/0166464 A1 May 28, 2020

(30) Foreign Application Priority Data
Nov. 27, 2018 (JP) ................. 2018-221000

(51) Int. Cl.
*G01N 1/00* (2006.01)
*G01N 21/74* (2006.01)
*F27D 5/00* (2006.01)
*G01N 21/31* (2006.01)

(52) U.S. Cl.
CPC ........... *G01N 21/74* (2013.01); *F27D 5/0068* (2013.01); *G01N 21/3103* (2013.01); *F27D 2005/0081* (2013.01)

(58) Field of Classification Search
CPC .............. G01N 1/2813; G01N 1/286; G01N 2001/284; G01N 1/2806; G02B 21/32
USPC ......................................................... 356/36
See application file for complete search history.

(56) References Cited

U.S. PATENT DOCUMENTS

| 10,552,965 B1* | 2/2020 | Kobayashi ............. G01N 21/74 |
| 2010/0073675 A1* | 3/2010 | Harada .............. G01N 21/3103 356/317 |
| 2017/0108450 A1* | 4/2017 | von Chamier-Glisczinski ............ G06K 9/64 |
| 2018/0138330 A1* | 5/2018 | Choi ..................... H01L 51/447 |

FOREIGN PATENT DOCUMENTS

JP     2017-207421 A     11/2017

* cited by examiner

*Primary Examiner* — Md M Rahman
(74) *Attorney, Agent, or Firm* — Sughrue Mion, PLLC

(57) ABSTRACT

An atomization unit has a tube-shaped furnace, and heats and atomizes a sample injected into the furnace. A light source unit emits light having a wavelength to be measured toward the atomization unit such that light passes through the furnace. An optical system transmits the light having the wavelength to be measured, of light passing through the furnace. A detection unit detects the light transmitted by the optical system. A light transmission plate is provided at a position in an optical path of the light passing through the furnace toward the detection unit, to obliquely cross an optical axis of the light. An image capturing unit is arranged outside the optical path, and captures an image inside the furnace by receiving light reflected by the light transmission plate, of the light passing through the furnace.

7 Claims, 1 Drawing Sheet

ATOMIC ABSORPTION SPECTROPHOTOMETER

BACKGROUND OF THE INVENTION

Field of the Invention

The present invention relates to an atomic absorption spectrophotometer.

Description of the Background Art

Japanese Patent Laying-Open No. 2017-207421 is a prior art document which discloses a configuration of an atomic absorption spectrophotometer. The atomic absorption spectrophotometer described in Japanese Patent Laying-Open No. 2017-207421 includes an atomization unit, a light source, a detector, an optical system, and a camera. The atomization unit has a tube-shaped furnace, and heats and atomizes a sample injected into the furnace. The light source emits light having a wavelength to be measured toward the atomization unit such that light passes through the furnace. The detector detects light passing through the furnace. The camera captures an image inside the furnace before absorbance of the atomized sample is measured.

In the atomic absorption spectrophotometer described in Japanese Patent Laying-Open No. 2017-207421, the camera is configured to be movable between an image capturing position on an optical path of the light from the light source and a non-image capturing position outside the optical path, and the camera is arranged at the image capturing position from when the sample is injected into the furnace to when ashing of the sample is finished. Accordingly, during drying and ashing treatment performed until the sample is ashed, the optical path is interrupted by the camera, and thus it is not possible for a detection unit to measure the absorbance of the sample during the drying and ashing treatment.

SUMMARY OF THE INVENTION

A main object of the present invention is to provide an atomic absorption spectrophotometer capable of determining, with high accuracy, whether drying and ashing treatment is performed normally, by measuring absorbance of a sample during the drying and ashing treatment by a detection unit, while capturing an image inside a furnace during the drying and ashing treatment by an image capturing unit.

An atomic absorption spectrophotometer based on the present invention includes an atomization unit, a light source unit, an optical system, a detection unit, a light transmission plate, and an image capturing unit. The atomization unit has a tube-shaped furnace, and heats and atomizes a sample injected into the furnace. The light source unit emits light having a wavelength to be measured toward the atomization unit such that light passes through the furnace. The optical system transmits the light having the wavelength to be measured, of light passing through the furnace. The detection unit detects the light transmitted by the optical system. The light transmission plate is provided at a position in an optical path of the light passing through the furnace toward the detection unit, to obliquely cross an optical axis of the light. The image capturing unit is arranged outside the optical path, and captures an image inside the furnace by receiving light reflected by the light transmission plate, of the light passing through the furnace.

In one aspect of the present invention, the atomic absorption spectrophotometer further includes a case which accommodates the optical system. The light transmission plate constitutes a part of the case. The light passing through the furnace transmits through the light transmission plate and enters the case.

In one aspect of the present invention, the atomic absorption spectrophotometer further includes a case which accommodates the optical system and the light transmission plate. The case has a window plate. The light passing through the furnace transmits through the window plate and enters the case.

In one aspect of the present invention, the light transmission plate is made of quartz.

The foregoing and other objects, features, aspects, and advantages of the present invention will become more apparent from the following detailed description of the present invention when taken in conjunction with the accompanying drawings.

DESCRIPTION OF THE PREFERRED EMBODIMENTS

Figure 1:
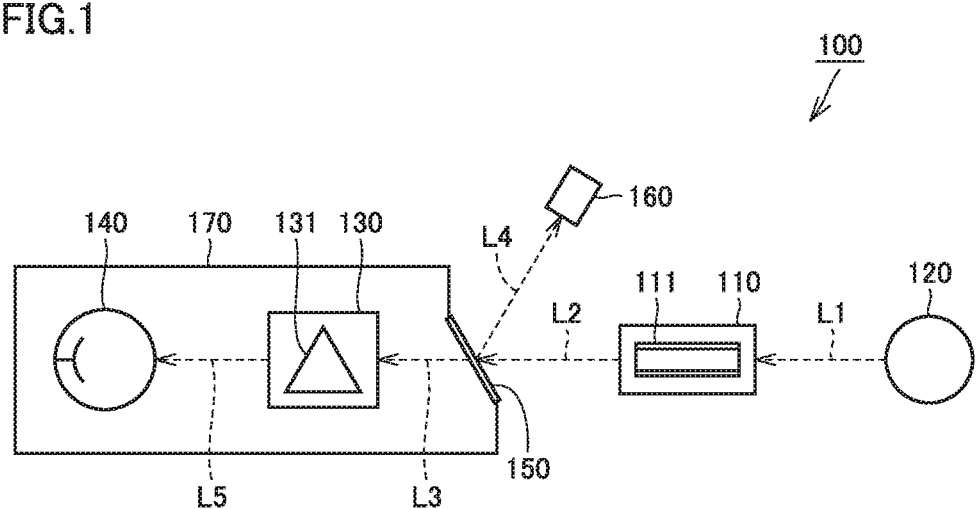
FIG. 1 is a schematic view showing a configuration of an atomic absorption spectrophotometer in accordance with a first embodiment of the present invention.

Hereinafter, an atomic absorption spectrophotometer in accordance with each embodiment of the present invention will be described with reference to the drawings. In the description of the embodiments below, identical or corresponding parts in the drawings will be designated by the same reference numerals, and the description thereof will not be repeated.

First Embodiment

FIG. 1 is a schematic view showing a configuration of an atomic absorption spectrophotometer in accordance with a first embodiment of the present invention. As shown in FIG. 1, an atomic absorption spectrophotometer 100 in accordance with the first embodiment of the present invention includes an atomization unit 110, a light source unit 120, an optical system 130, a detection unit 140, a light transmission plate 150, and an image capturing unit 160. In the present embodiment, atomic absorption spectrophotometer 100 further includes a case 170 which accommodates optical system 130.

Atomization unit 110 has a tube-shaped furnace 111, and heats and atomizes a sample injected into furnace 111. Specifically, atomization unit 110 has a graphite tube as furnace 111. A hole not shown for injecting the sample is provided in an upper portion of the graphite tube. By passing a large current through the graphite tube, the sample injected into the graphite tube is heated to a high temperature and atomized.

Light source unit 120 emits light having a wavelength to be measured toward atomization unit 110 such that light L1 passes through furnace 111. In the present embodiment, a hollow cathode lamp is used as light source unit 120. A hollow cathode lamp emits light including a bright line spectrum. It should be noted that light source unit 120 is not limited to a hollow cathode lamp, and may have any light source capable of emitting light having a wavelength to be measured.

Optical system 130 transmits the light having the wavelength to be measured, of light L2 passing through furnace 111. Optical system 130 includes a spectroscope 131, and a light collection optical system not shown arranged between atomization unit 110 and spectroscope 131.

Spectroscope 131 has an inlet-side slit, a diffraction grating, and an outlet-side slit. Light L3 passing through the graphite tube and incident on the inlet-side slit is dispersed by the diffraction grating, and thereby light L5 having the wavelength to be measured exits from the outlet-side slit.

Detection unit 140 detects light L5 transmitted by optical system 130. In the present embodiment, a photomultiplier tube is used as detection unit 140. An electrical signal obtained through photoelectric conversion by the photomultiplier tube is input to a control unit not shown.

Light transmission plate 150 is provided at a position in an optical path of light L2 passing through furnace 111 toward detection unit 140, to obliquely cross an optical axis of light L2. Relative to light transmission plate 150, an incident angle of incident light L2 is 60°, for example, and a reflection angle of reflected light L4 is 60°, for example.

Light transmission plate 150 constitutes a part of case 170. Specifically, light transmission plate 150 has a function as a window plate for preventing entrance of outdoor air into case 170. Light L2 passing through furnace 111 transmits through light transmission plate 150 and enters case 170. In the present embodiment, light transmission plate 150 is made of quartz. It should be noted that the material for light transmission plate 150 is not limited to quartz, and any material through which the light having the wavelength to be measured can transmit may be adopted.

Image capturing unit 160 is arranged outside the optical path of light L2, and captures an image inside furnace 111 by receiving light L4 reflected by light transmission plate 150, of light L2 passing through furnace 111. In the present embodiment, a camera is used as image capturing unit 160. For example, 10% of incident light L2 becomes reflected light L4, and 90% of incident light L2 becomes transmitted light L3.

The following describes operation of atomic absorption spectrophotometer 100 in accordance with the first embodiment of the present invention.

First, a voltage is applied to light source unit 120 to cause light source unit 120 to generate light having a wavelength to be measured, and capturing of an image inside furnace 111 by image capturing unit 160 is started and measurement of absorbance of the light having the wavelength to be measured by detection unit 140 is also started.

Then, a sample is injected into furnace 111, and increasing of temperature of furnace 111 is started. As the temperature of furnace 111 is increased, the sample is dried. Specifically, moisture included in the sample becomes water vapor and is removed. As the temperature of furnace 111 is further increased, the sample is ashed. Specifically, an organic compound included in the sample is oxidized and decomposed, and becomes a gas and is removed. It should be noted that drying and ashing treatment includes heat treatment performed until the injected sample is ashed. As the temperature of furnace 111 is further increased, the sample is atomized. Specifically, bond in a compound is broken to produce atomic vapor.

From when the injection of the sample into furnace 111 is started to when the sample is atomized and the measurement of the absorbance is completed, image capturing unit 160 continues the capturing of the image inside furnace 111, and detection unit 140 continues the measurement of the absorbance.

In atomic absorption spectrophotometer 100 in accordance with the first embodiment of the present invention, image capturing unit 160 is arranged outside the optical path of light L2, and captures the image inside furnace 111 by receiving light L4 reflected by light transmission plate 150, of light L2 passing through furnace 111.

Thus, from when the injection of the sample into furnace 111 is started to when the sample is atomized and the measurement of the absorbance is completed, detection unit 140 can continue the measurement of the absorbance. Thereby, whether the treatment of drying and ashing the sample is performed normally can be determined. Specifically, whether the treatment of drying and ashing the sample is performed normally can be determined by measuring absorbance of each of the water vapor and the gas produced during the treatment of drying and ashing the sample.

In addition, from when the injection of the sample into furnace 111 is started to when the sample is atomized and the measurement of the absorbance is completed, image capturing unit 160 can continue the capturing of the image inside furnace 111. Thereby, whether each of the injection of the sample and the treatment of drying and ashing the sample is performed normally can be determined.

Specifically, whether the injection of the sample is performed normally can be determined by observing the position of the sample injected into furnace 111 and the state of the sample after the injection. Whether the treatment of drying and ashing the sample is performed normally can be determined by observing the state of the sample during the drying and ashing treatment. For example, when bumping or the like occurs and scattering of the sample is observed, such a case can be determined as an abnormality in the treatment of drying and ashing the sample.

As described above, whether the drying and ashing treatment is performed normally can be determined with high accuracy, by measuring the absorbance of the sample during the drying and ashing treatment by detection unit 140, while capturing the image inside furnace 111 during the drying and ashing treatment by image capturing unit 160.

When it is determined that there is an abnormality in the drying and ashing treatment, atomization of the sample and subsequent operation are not performed, which can suppress abnormal measurement data from being obtained. As a result, measurement data of atomic absorption spectrophotometer 100 can have increased reliability.

In the present embodiment, since image capturing unit 160 captures the image inside furnace 111 by receiving light L4 reflected by light transmission plate 150 which has a function as a window plate, such a configuration can suppress reduction of the amount of transmitted light L3 entering case 170 due to the capturing of the image inside furnace 111 by image capturing unit 160. This can suppress reduction of the amount of light L5 detected by detection unit 140, and thus can maintain measurement sensitivity of atomic absorption spectrophotometer 100. In addition, since there is no need to provide a drive mechanism for making image capturing unit 160 movable, the configuration of atomic absorption spectrophotometer 100 can be simplified.

In the present embodiment, since light transmission plate 150 is made of quartz, light having a wavelength in a wide range from ultraviolet light to infrared light can transmit through light transmission plate 150 and enter case 170. Thereby, a wide range of choices for the wavelength to be measured can be provided.

Second Embodiment

In the following, an atomic absorption spectrophotometer in accordance with a second embodiment of the present invention will be described with reference to the drawing. It should be noted that, since the atomic absorption spectrophotometer in accordance with the second embodiment of the present invention is different from atomic absorption spectrophotometer 100 in accordance with the first embodiment of the present invention mainly in that the former includes a window plate in addition to the light transmission plate, the components which are identical to those in atomic absorption spectrophotometer 100 in accordance with the first embodiment of the present invention will not be described repeatedly.

Figure 2:
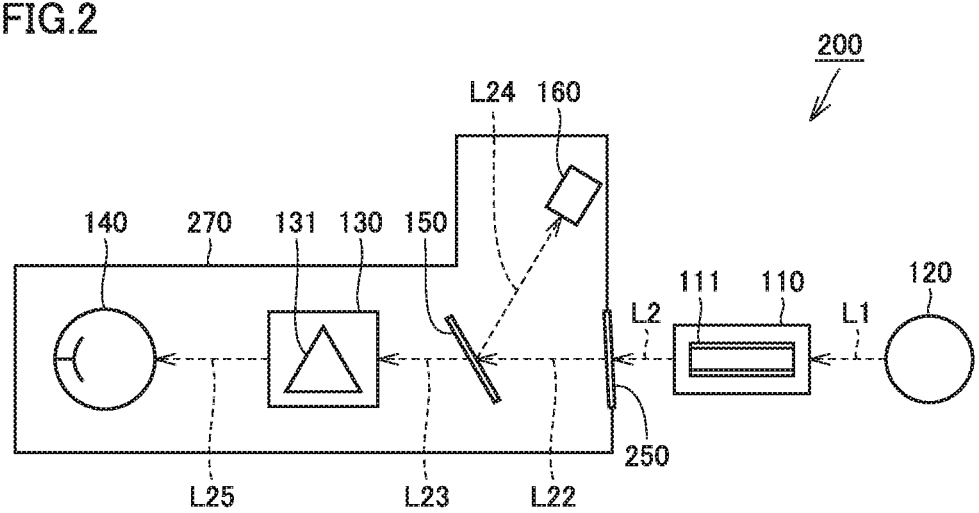
FIG. 2 is a schematic view showing a configuration of an atomic absorption spectrophotometer in accordance with a second embodiment of the present invention.

FIG. 2 is a schematic view showing a configuration of an atomic absorption spectrophotometer in accordance with a second embodiment of the present invention. As shown in FIG. 2, an atomic absorption spectrophotometer 200 in accordance with the second embodiment of the present invention includes atomization unit 110, light source unit 120, optical system 130, detection unit 140, light transmission plate 150, and image capturing unit 160. In the present embodiment, atomic absorption spectrophotometer 200 further includes a case 270 which accommodates optical system 130 and light transmission plate 150.

Case 270 has a window plate 250 for preventing entrance of outdoor air into case 270. Light L2 passing through furnace 111 transmits through window plate 250 and enters case 270. In the present embodiment, window plate 250 is made of quartz. It should be noted that the material for window plate 250 is not limited to quartz, and any material through which the light having the wavelength to be measured can transmit may be adopted.

Light L22 transmitting through window plate 250 is incident on light transmission plate 150. Light transmission plate 150 is provided to obliquely cross an optical axis of light L22. Relative to light transmission plate 150, an incident angle of incident light L22 is 60°, for example, and a reflection angle of reflected light L24 is 60°, for example.

Image capturing unit 160 is arranged outside an optical path of light L22 within case 270, and captures an image inside furnace 111 by receiving light L24 reflected by light transmission plate 150, of light L22 transmitting through window plate 250. For example, 10% of incident light L22 becomes reflected light L24, and 90% of incident light L22 becomes transmitted light L23.

Light L23 transmitting through light transmission plate 150 and incident on the inlet-side slit of spectroscope 131 is dispersed by the diffraction grating, and thereby light L25 having the wavelength to be measured exits from the outlet-side slit. Detection unit 140 detects light L25 transmitted by optical system 130.

Since atomic absorption spectrophotometer 200 in accordance with the second embodiment of the present invention includes window plate 250 in addition to light transmission plate 150, the degree of freedom of arranging light transmission plate 150 can be secured. In addition, since image capturing unit 160 is arranged within case 270, image capturing unit 160 can be suppressed from being affected by ambient light.

In the present embodiment, since image capturing unit 160 captures the image inside furnace 111 by receiving light L24 which transmits through window plate 250 and is reflected by light transmission plate 150, the amount of light L25 detected by detection unit 140 decreases by about 10%, and thus measurement sensitivity of atomic absorption spectrophotometer 200 decreases by about 10%, in comparison with atomic absorption spectrophotometer 100 in accordance with the first embodiment of the present invention.

Although the embodiments of the present invention have been described above, it should be understood that the embodiments disclosed herein are illustrative and non-restrictive in every respect. The scope of the present invention is defined by the scope of the claims, and is intended to include any modifications within the scope and meaning equivalent to the scope of the claims.

What is claimed is:

1. An atomic absorption spectrophotometer comprising:
   a tube-shaped furnace configured to heat and atomize a sample injected into the furnace;
   a light source which emits light having a wavelength to be measured toward the furnace such that the emitted light passes through the furnace;
   optics which transmits the emitted light having the wavelength to be measured after the emitted light has passed through the furnace;
   a detector which detects the light transmitted by the spectroscope;
   a light transmission plate provided at a position in an optical path of the emitted light that has passed through the furnace, the light transmission plate being configured to obliquely cross the optical path of the emitted light; and
   a camera which is arranged outside the optical path, and is configured to capture an image inside the furnace by receiving the emitted light reflected by the light transmission plate.

2. The atomic absorption spectrophotometer according to claim 1, further comprising a case which accommodates the optics, wherein
   the light transmission plate constitutes a part of the case, and
   the emitted light that has passed through the furnace transmits through the light transmission plate and enters the case.

3. The atomic absorption spectrophotometer according to claim 1, further comprising a case which accommodates the optics and the light transmission plate, wherein
   the case has a window plate, and
   the emitted light that has passed through the furnace transmits through the window plate and enters the case.

4. The atomic absorption spectrophotometer according to claim 1, wherein the light transmission plate is made of quartz.

5. The atomic absorption spectrophotometer according to claim 2, wherein the light transmission plate is made of quartz.

6. The atomic absorption spectrophotometer according to claim 3, wherein the light transmission plate is made of quartz.

7. The atomic absorption spectrophotometer according to claim 3, wherein the light transmission plate is angled, with respect to the optical path, to reflect the emitted light toward the camera.

* * * * *